US012799383B2

(12) United States Patent
Recio et al.

(10) Patent No.: US 12,799,383 B2
(45) Date of Patent: Nov. 17, 2026

(54) METHODS AND COMPOSITIONS USED IN CONTROLLING FORMATION SAND PRODUCTION, PROPPANT FLOWBACK, AND FINES MIGRATION

(71) Applicant: Halliburton Energy Services, Inc., Houston, TX (US)

(72) Inventors: Antonio Recio, Houston, TX (US); Enrique Antonio Reyes, Houston, TX (US); Shoy George, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 19/296,375

(22) Filed: Aug. 11, 2025

(65) Prior Publication Data

US 2025/0368887 A1 Dec. 4, 2025

Related U.S. Application Data

(62) Division of application No. 18/620,285, filed on Mar. 28, 2024, now abandoned.

(51) Int. Cl.
*C09K 8/565* (2006.01)

(52) U.S. Cl.
CPC .................................... *C09K 8/565* (2013.01)

(58) Field of Classification Search
CPC .......... C09K 8/565; C09K 8/56; C09K 8/575; C09K 8/5753; C09K 8/5751; C09K 8/5756; C09K 8/5755; C09K 8/5758; C08L 63/00
See application file for complete search history.

(56) References Cited

U.S. PATENT DOCUMENTS

| | | | | |
|---|---|---|---|---|
| 4,220,566 | A | 9/1980 | Constien et al. | |
| 7,114,570 | B2 | 10/2006 | Nguyen et al. | |
| 8,727,002 | B2 | 5/2014 | Reyes | |
| 9,103,206 | B2 * | 8/2015 | Alberty | E21B 43/26 |
| 9,670,386 | B2 | 6/2017 | Reyes et al. | |
| 10,002,954 | B2 | 6/2018 | Hafez et al. | |
| 10,155,902 | B2 * | 12/2018 | Salla | E21B 43/267 |
| 10,266,749 | B2 * | 4/2019 | Belakshe | C09K 8/92 |
| 10,501,684 | B2 * | 12/2019 | Salla | C09K 8/52 |
| 10,519,361 | B2 | 12/2019 | Wadekar et al. | |

(Continued)

FOREIGN PATENT DOCUMENTS

| | | | |
|---|---|---|---|
| CN | 105368425 | A | 3/2016 |
| CN | 109097014 | A | 12/2018 |

OTHER PUBLICATIONS

Foreign Communication from Related Application—International Search Report and Written Opinion of the International Searching Authority, International Application No. PCT/US2025/012114, dated May 13, 2025, 10 pages.

*Primary Examiner* — Angela M DiTrani Leff
(74) *Attorney, Agent, or Firm* — Conley Rose, P.C.; Rodney B. Carroll

(57) ABSTRACT

A binder composition, and methods relating thereto, can comprise a poly-epoxy glycerol-based oil, a crosslinker, and a soluble organic acid with two or more acid groups. The binder composition has an activation temperature of from about 25 °C to about 400 °C. The binder material can be used, for example, to bind particulate material to form consolidated particulate material in a wellbore or subterranean formation.

18 Claims, 4 Drawing Sheets

(56) References Cited

U.S. PATENT DOCUMENTS

| | | | |
|---|---|---|---|
| 11,118,305 | B2 | 9/2021 | Stewart et al. |
| 2014/0131041 | A1 | 5/2014 | Liang et al. |
| 2016/0215088 | A1 | 7/2016 | Omonov et al. |
| 2016/0319179 | A1 | 11/2016 | De Stefano et al. |
| 2018/0128070 | A1 | 5/2018 | Chang et al. |

* cited by examiner

METHODS AND COMPOSITIONS USED IN CONTROLLING FORMATION SAND PRODUCTION, PROPPANT FLOWBACK, AND FINES MIGRATION

CROSS-REFERENCE TO RELATED APPLICATIONS

The present application is a divisional of and claims priority to U.S. patent application Ser. No. 18/620,285 filed Mar. 28, 2024, which is hereby incorporated by reference in its entirety.

TECHNICAL FIELD

This application relates to a method of servicing a well having a wellbore extending from a surface wellsite and penetrating a subterranean formation. More specifically, this application relates to (i) contacting a binder composition including plant-based material with particulate material, and (ii) binding the particulate material with the binder composition to form consolidated particulate material in the wellbore, in the formation, or both, to aid in drilling the wellbore, treating (e.g., fracturing) the subterranean formation, and/or producing natural resources (e.g., hydrocarbons, water, steam, carbon dioxide, hydrogen sulfide) from the subterranean formation via the wellbore. Further applications can encompass the disposal of pernicious substances such as fluorinated organics such as the broad class of per-and poly-fluoroalkyl substances (PFAS), and other halogenated hydrocarbons by injecting the fluorinated organics into subterranean formations.

BACKGROUND

Producing or recovering fluids (e.g., hydrocarbons) from subterranean formations can be impacted by collapsing or sloughing of the walls of well boreholes extending into such formations or by backflow of sand towards the wellbore. The very fine particles are subject to movement by fluid flowing at relatively low rates, as compared to larger grains not subject to significant movement at such low rates.

In other operations, such as fracturing, where a relatively large volume of fluid is forced to flow through such a silty or dirty sand, the very fine particles tend to be carried along until they become lodged in the smaller interstices. This movement of particles plugs the openings and reduces permeability, e.g., during placement of proppant during fracturing and/or during subsequent flow of produced hydrocarbons through the proppant bed. In wellbore operations such as drilling, treating/fracturing, and producing, consolidation of fine particles can be a solution to drifting of fine particulates. Consolidation can involve a variety of resins systems placed downhole to clump smaller particles to larger particles to minimize drifting and plugging within the formation (e.g., proppant pack) and/or wellbore (e.g., sand screen completion).

Thus, an ongoing need exists for improved compositions and methods of consolidating fine particulate material in a wellbore and/or the surrounding formation.

DETAILED DESCRIPTION

Figure 1:
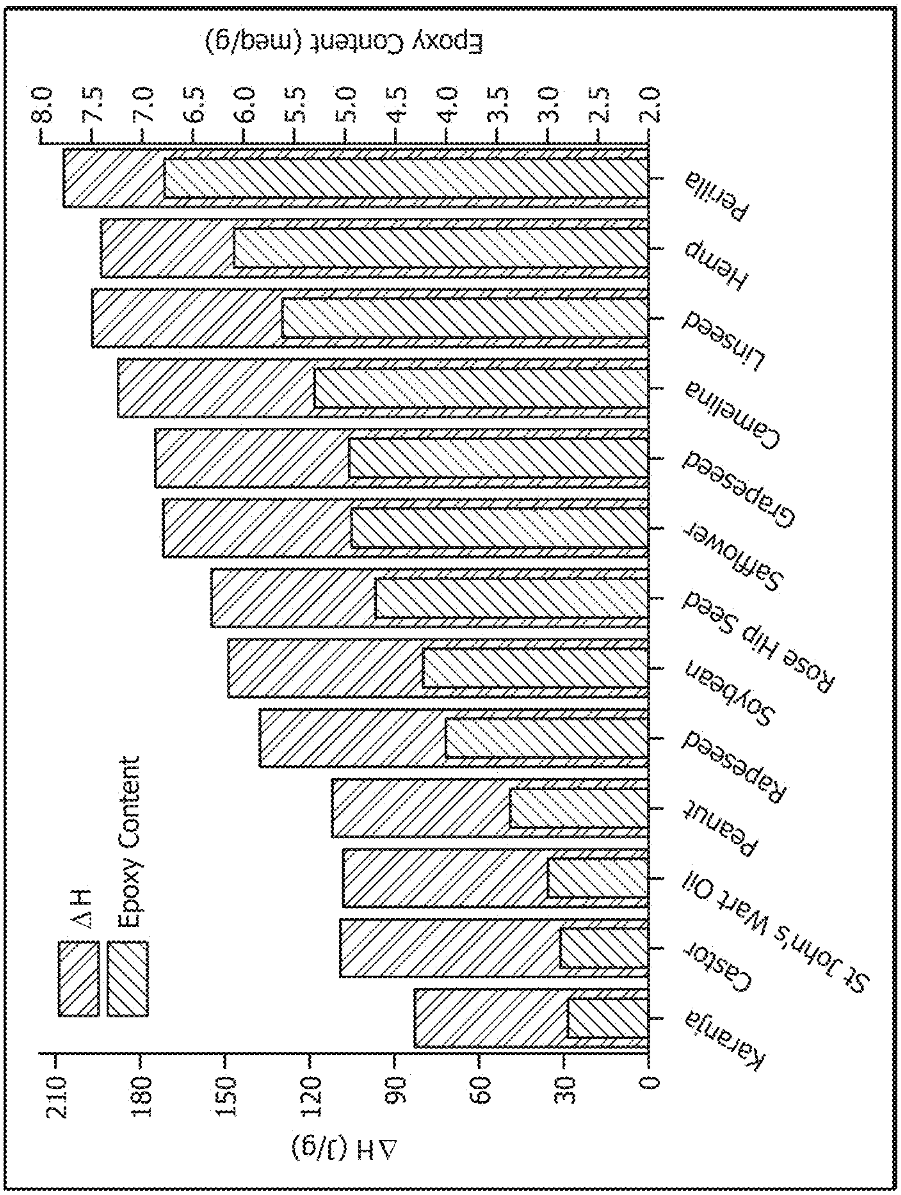
FIG. 1 is a graphical depiction of enthalpy and epoxy context for several precursor oils subject to epoxidation in accordance with certain embodiments.

As used herein, carbon(s) in a moiety such as an alkyl, an alkenyl, an alkynyl, an alkylethoxylate, or an alkyloxy can be abbreviated as $C_1$, $C_2$, $C_3$, etc. where "C" represents carbon and the subscript represents the number of carbon atoms in the moiety.

As used herein, the term "and/or" can mean one or more of items in any combination in a list, such as "A and/or B" means "A, B, or the combination of A and B".

As used herein, the term "epoxidated" means a material, such as an oil, e.g., soybean oil, subject to epoxidation. The term "epoxidized" may be used interchangeably with "epoxidated".

The present disclosure relates to environmentally safe binder compositions and methods used in consolidating particulates for controlling formation sand production, proppant flowback, and fines migration. There is a general demand for binder compositions to have improved compatibility with the environment, particularly in sensitive regions such as the North Sea. Such binder compositions can satisfy the Registration, Evaluation, Authorization, and Restriction (REACH) regulation, which is met prior to use within the European Union, and may be placed on the Platform for Offshore Non-hazardous Operations and Reporting (PLONOR) list to be considered as posing little or no risk to the environment. In some embodiments, the binder composition disclosed herein can include one or more biomolecular materials derived from plants and marine organisms that can be produced by bio-synthetic pathways. As an example, a representative binder composition can consist of or include epoxidated soy bean oil and any suitable organic acid, such as an organodiacid. In some aspects, the suitable organic acid can be derived from fruits such as apples. A crosslinker chemical derived from plants, such as brown algae, may be used to react the epoxidated soy bean oil and the organic acid. This combination of chemistries can provide a material that can function as an adhesive or sealant, for consolidating sand grains together to impart compressive strength to particulate and conglomerates newly introduced into an underground or subterranean formation, or restore compressive strength into failing proppant packs and formation sands.

In some embodiments, the binder composition can be activated and cured in the absence of any amine crosslinkers or aminosilane docking agents. An aminosilane docking agent can be a molecule used to attach or "dock" certain functional groups or other molecules onto a surface. In some instances, an amino-functional coupling agent can be used to provide bonding between inorganic substrates and organic polymers. In some aspects, the composition can be absent (i.e., zero weight percent, also referred to as "free of") or substantially absent of amines, silanes and/or siloxanes, but may contain amino acids. Generally, a substance is substantially absent of a material, such as an amine crosslinker, if from zero or greater than zero (e.g., 0.000001 weight percent (wt. %)) to less than or equal to about 1.0 wt. %, about 0.5 wt. %, or even about 0.1 wt. %, from zero or greater than zero (e.g., 0.000001 wt. %) to less than or equal to about 0.01 wt. %, or from zero or greater than zero (e.g., 0.000001 wt. %) to less than or equal to about 0.001 wt. %, of material present based on the total weight of the crosslinker.

A binder composition can be placed in the wellbore (e.g., wellbore wall), the formation surrounding the wellbore, and/or propped fractures extending into the formation, to provide consolidation of particulates, transforming them into hardened, permeable aggregates and/or solid masses to hold them in place during well production. A version of this binder can be dry coated (e.g., placed onto the proppant material such as sand while the sand is in dry state prior to being placed in a mix tub with aqueous carrier fluid) or wet coated (e.g., placed onto the proppant material such as sand while the sand is in wet state after being placed in a mix tub with aqueous carrier fluid) onto the fracturing proppant such as sand during a hydraulic fracturing treatment to provide consolidation and keep the proppant in place during well production or injection.

In some embodiments, a binder composition can include a poly-epoxy glycerol-based oil, a soluble organic acid with two or more acid groups, and a crosslinker. The binder composition can have an activation temperature in a broadest range of from about 25 °C to about 400 °C; in an intermediate range of from about 45 °C to about 180 °C; or in a preferred range of from about 50 °C to about 93 °C. In some aspects, the activation temperature can be less than or equal to about 250 °C, about 240 °C, about 230 °C, about 220 °C, about 210 °C, about 200 °C, about 190 °C, about 180 °C, about 170 °C, about 160 °C, about 150 °C, about 140 °C, about 130 °C, about 120 °C, about 110 °C, about 100 °C, about 90 °C, about 80 °C, about 70 °C, about 60 °C, about 50 °C, about 40 °C, or about 30° C., and/or the activation temperature can be greater than or equal to about 25 °C, about 30 °C, about 40 °C, about 50 °C, about 60 °C, about 70 °C, about 80 °C, about 90 °C, about 100 °C, about 110 °C, about 120 °C, about 130 °C, or about 140 °C.

In some embodiments, the poly-epoxy glycerol-based oil comprises an epoxidated terpene, an epoxidated terpenoid, a dimerized epoxidated terpene, a dimerized epoxidated terpenoid, a trimerized epoxidated terpene, a trimerized epoxidated terpenoid, an epoxidated oligomeric terpene, an epoxidated oligomeric terpenoid, a polymerized epoxidated terpene, a polymerized epoxidated terpenoid, a limonene oxide, an epoxidated poly-(polyene-oxide-isoprene-oxide), an epoxidated copolymer of poly-(butadiene oxide)-co-polybutadiene, an epoxidated farnesene, an epoxidated mircene, an epoxidated bisabolene, an epoxidated terpinolene, an epoxidated terpinol, an epoxidated eleostearic acid, an epoxidated acid linoleic, an epoxidated linolenic acid, an epoxidated linseed oil, an epoxidated tung oil, an epoxidated soybean oil, an epoxidated peanut oil, an epoxidated avocado oil, an epoxidated sunflower oil, an epoxidated corn oil, an epoxidated cottonseed oil, an epoxidated palm oil, an epoxidated soybean oil, an epoxidated canola oil, an epoxidated linseed oil, an epoxidated soy methylester, an epoxidated linseed methyl ester, an epoxidated tall oil fatty acid (TOFA), an epoxidated acetylated-triacylglycerol, an epoxidated acetylated-diacylglycerol, an epoxidated acetylated-monoacylglycerol, an epoxidated jojoba oil, an epoxidated 2-ethylhexyl soyate, an epoxidated 2-ethylhexyl TOFA, an epoxidated isoamyl soyate, an epoxidated isoamyl palm stearin, an epoxidated isoamyl TOFA, an epoxidated isoamyl soyate, an epoxidated soy methyl ester acetic acid estolide, a glycerol diglycidyl ether, a glycerol triglycidyl ether, an epoxidated sorbitol, a sorbitol diglycidyl ether, a sorbitol triglycidyl ether, a sorbitol tetraglycidyl ether, a sorbitol pentaglycidyl ether, a sorbitol hexaglycidyl ether, a diglycidyl ether, a cyclohexananidanyl bisphenol A hydrogenated diglicidyl ether, a neopentyl glycol diglycidyl ether, an ethylene glycol diglycidyl ether, a 1,4-butanediol diglycidyl ether, a tetraethylene glycol diglycidyl ether, a polydimethyl siloxane diglycidyl ether, an epoxidated grapefruit mercaptan, a bisphenol A diglycidyl ethoxylated ether, a bisphenol A diglycidyl ethoxylated ether, a cyclohexanedimethanol diglycidyl ethoxylated ether, or a combination thereof. As an example, the poly-epoxy glycerol-based oil comprises at least two epoxide groups, such as an epoxidated soy bean oil. In some aspects, the poly-epoxy glycerol-based oil can include an epoxidated soybean oil, an epoxidated linseed oil, an epoxidated hemp oil, an epoxidated perilla oil, a fraction thereof, or a combination thereof. An oil can be epoxidated by using any suitable method known to those of skill in the art. Alternatively, such epoxidated oils are available commercially.

Generally, the poly-epoxy glycerol-based oil can be made from an unsaturated oil precursor by epoxidizing the precursor, e.g., reacting the precursor to form one or more epoxide groups. In some embodiments, the unsaturated oil precursor of the poly-epoxy glycerol-based oil can include an açai oil, an almond oil, an amaranth oil, an apple seed oil, an apricot oil, an argan oil, an avocado oil, a babassu oil, a beech nut oil, a ben oil, a bitter gourd oil, such as from one or more seeds of *Momordica charantia*, a black seed oil, a blackcurrant seed oil, such as from one or more seeds of *Ribes nigrum*, a borage seed oil, such as from one or more seeds of seeds of *Borago officinalis*, a borneo tallow nut oil, a bottle gourd oil, such as from one or more seeds of seeds of *Lagenaria siceraria*, a buffalo gourd oil, such as from one or more seeds of *Cucurbita foetidissima*, a butternut squash seed oil, such as from one or more seeds of *Cucurbita moschata*, a camelina sativa oil, a cape chestnut oil, such as a yangu oil, a carob pod oil, a cashew oil, a cocklebur oil, a cocoa butter, a coconut oil, a cohune oil, a coriander seed oil, a corn oil, a cottonseed oil, a date seed oil, a dika oil, an egusi seed oil, such as from one or more seeds of *Cucumeropsis mannii naudin*, an evening primrose oil, such as from one or more seeds of *Oenothera biennis*, a flaxseed oil, such as from one or more seeds of *Linum usitatissimum*, a grape seed oil, a grapefruit seed oil, a hazelnut oil, a hemp oil, a kapok seed oil, a kenaf seed oil, such as from one or more seeds of *Hibiscus cannabinus*, a *lallemantia* oil, such as from one or more seeds of *Lallemantia iberica*, a linseed oil, a macadamia oil, a mafura oil, such as from one or more seeds of *Trichilia emetic*, a manila oil, such as from one or more kernels of *Sclerocarya birrea*, a meadowfoam seed oil, a mongongo nut oil, such as a manketti oil, a mustard oil, a niger seed oil, an okra seed oil, an olive oil, an orange oil, a palm oil, a papaya seed oil, a peanut oil, a pecan oil, a pequi oil, such as from one or more seeds of *Caryocar brasiliense*, a perilla seed oil, a persimmon seed oil, such as from one or more seeds of *Diospyros virginiana*, a pili nut oil, such as from one or more seeds of *Canarium ovatum*, a pistachio oil, a pomegranate seed oil, a poppyseed oil, a prune kernel oil, a pumpkin seed oil, a quinoa oil, a ramtil oil, such as from *Guizotia abyssinica* or a Niger pea, a rapeseed oil, a rice bran oil, a royal oil, such as from one or more seeds of *Prinsepia utilis*, a safflower oil, a sapote oil, a seje oil, such as from one or more seeds of *Jessenia bataua*, a sesame oil, a shea butter, a soybean oil, a sunflower oil, a taramira oil, a tea seed oil, such as a Camellia oil, a thistle oil, a tigernut oil or a nut-sedge oil, a tobacco seed oil, a tomato seed oil, a walnut oil, a watermelon seed oil, a wheat germ oil, an agarwood oil, an allspice oil, an anise oil, a basil oil, a bay leaf oil, a benzoin oil, a bergamot oil, a buchu oil, a camphor oil, a cannabis oil, a cassia oil, a cedar oil, a celery oil, a chamomile oil, a cinnamon oil, a clary sage oil, a clove oil, a copaiba oil, a cumin oil, an eucalyptus oil, a frankincense oil, a galangal oil, a geranium oil, a ginger oil, a grapefruit oil from, e.g., grapefruit rinds, a guava oil, a hops oil, a hyssop oil, a jasmine oil, a juniper oil, a lavender oil, a lemon oil, a lemongrass oil, a lime oil, a manuka oil, a mandarin orange oil, a marjoram oil, a melaleuca oil, a myrrh oil, a nutmeg oil, an oregano oil, a patchouli oil, a peppermint oil, a pine oil, a rose oil, a rosehip oil, a rosemary oil, a rosewood oil, a sage oil, a sandalwood oil, a sassafras oil, a spearmint oil, a tangerine oil, a tea tree oil, a thyme oil, a tsuga oil, a valerian oil, a vanilla oil, a wintergreen oil, a ylang-ylang oil, a fraction thereof (e.g., one or more components of the oil), or a combination thereof. In some aspects, the unsaturated oil precursor of the poly-epoxy glycerol-based oil comprises a soybean oil, a linseed oil, a hemp oil, a perilla oil, a fraction thereof, or a combination thereof.

In some aspects, the poly-epoxy glycerol-based oil can include an epoxy content of about 1.0 to about 10 milliequivalent per gram (meq/g), preferably about 2.5 to about 8.0 meq/g, and optimally about 4.0 and about 7.5 meq/g. Generally, 1,000 meq/g is equivalent to 1,000 millimole per gram (mmol/g), 1,000 milliequivalent per centimeter cubed (meq/$cm^3$), or 1,000 mmol/$cm^3$. Referring to FIG. 1, various oil precursors, such as karanja, castor, St. John's wort oil, etc. are listed on an x-axis and are compared with respect to enthalpy in Joules per gram (J/g), and epoxy content after each oil precursor is epoxidated. Particularly suitable precursor oils due to their epoxy content after epoxidation can include soybean, linseed, and perilla.

In some embodiments, the two or more acid groups of the soluble organic acid can be two or more carboxylic acid groups, particularly alpha-hydroxycarboxylic acids, or the soluble organic acid with two or more acid groups can include citric acid, tartaric acid, malonic acid, succinic acid, glycolic acid, lactic acid, hydroxybutyric acid, mandelic acid, malic acid, a-hydroxyglutaric acid, glyceric acid, tartronic acid, quinic acid, 1-hydroxycyclopentanecarboxylic acid, oxalic acid, ellagic acid or a combination thereof, and preferably malic acid. Generally, the soluble organic acid has a low molecular weight. In some embodiments, the soluble organic acid can have a molecular weight less than or equal to about 500 gram/mole (g/mol), about 400 g/mol, about 300 g/mol, about 200 g/mol, about 190 g/mol, about 180 g/mol, about 170 g/mol, about 160 g/mol, about 150 g/mol, about 140 g/mol, about 130 g/mol, about 120 g/mol, about 110 g/mol, about 100 g/mol, about 90 g/mol, or about 80 g/mol. In some embodiments, the soluble organic acid can have a molecular weight of about 70 g/mol to about 320 g/mol, about 80 g/mol to about 250 g/mol, or about 80 g/mol to about 200 g/mol. Although not wanting to be bound by theory, the presence of two or more acid groups, such as carboxylic acid groups, lowers the activation temperature as compared to compounds with only one acid group.

In some embodiments, the crosslinker can facilitate the reaction of the organic acid with two or more acid groups and a poly-epoxy glycerol-based oil, and the crosslinker can include a polyphenol, such as a tannin, including tannic acid, derived from any suitable plant, including terrestrial plants and sea plants. In some aspects, the crosslinker can include a terrestrial plant derived crosslinker, e.g., a tannin or derivative thereof, such as gallotannins, ellagitannins, and/or proanthocyanidins; a sea plant, e.g., brown algae, derived crosslinker, e.g., a tannin or derivative thereof, such as phlorotannins; a phloroglucinol; tannic acid; a plant derivative, such as a polyphenol; a polyphenol comprising one or no terminal acid groups; a polyphenol comprising one or no terminal carboxylic acid groups; an amino acid preferably comprising a phenolic moiety; or a combination thereof. As an example, the crosslinker can include a polyphenol, which can be a flavonoid, a stilbene, a lignan, a phenolic acid, a tannin, or a combination thereof. In some aspects, the tannin can be a polyphenolic acid, e.g., a tannic acid. In some embodiments, the crosslinker can include catechol, pyrogallol, hydroxyquinol, phlorolucinol, 1,2,4-benzenetriol, 1,2,3,4-tetrahydroxybenzene, 2,4,5-trihydroxybenzoic acid, 3,4,5-trihydroxybenzoic acid, such as gallic acid, a tannic acid, 2,3,4-trihydroxybenzoic acid, 2,3-dihydroxybenzoic acid, 3,4-dihydroxybenzoic acid, 6,7-dihydroxycoumarin, an ellagic acid, an urushiol, a chlorogenic acid, a caffeic acid, a flavanol, a flavonodid, a catechin, an anthocyanidin, an isoflavanoid, an amino acid comprising a phenolic moiety, or a combination thereof, and preferably tannic acid. In an aspect, the crosslinker comprises a polyphenol, for example a phenolic acid, for example of polyphenolic acid. Further, monomers including a 1,2-dihydroxybenzene moiety may comprise polymerizable derivatives of 1,2-dihydroxybenzene compounds or 1,2,3-trihydroxybenzene compounds.

In some embodiments, tannic acid, a naturally occurring ester of glucose and gallic acid, can be used as a crosslinker. Although tannic acid is often sold commercially as a product having the formula C76H52046, having a molecular weight (MW) of about 1,700 g/mol, one of ordinary skill in the art will recognize that tannic acid represents a plurality of such ester products having a molecular weight of less than about 3,000 g/mol and, more particularly, a molecular weight of about 500 g/mol to about 3,000 g/mol. In some aspects, the crosslinker can be substantially absent an amine crosslinker, an aminosilane docking agent, or a combination thereof.

In an aspect, the binder composition includes an epoxidized vegetable oil, such as an epoxidized castor oil, an epoxidized peanut oil, an epoxidized linseed oil, an epoxidized soybean oil, and/or an epoxidized perilla oil; a plant-based crosslinker, such as a tannic acid and/or a lignin; and/or a diacid such as a maleic anhydride, an oxalic acid, and/or a malic acid; or any combination thereof.

Although not wanting to be bound by theory, the binding further includes allowing an organic acid with two or more acid groups to react in the presence of a crosslinker with the poly-epoxy glycerol-based oil at an activation temperature in a broadest range of from about 25 °C to about 400 °C; in an intermediate range of from about 45 °C to about 180 °C; or in a preferred range of from about 50 °C to about 93 °C. An activation temperature indicates the initiation of the viscosification of the binder composition.

Aqueous fluids that may be suitable as a carrier fluid for use in the treatment fluid, methods, and systems may include water from any source. Such aqueous fluids may include fresh water, salt water (e.g., water containing one or more salts dissolved therein), brine (e.g., saturated salt water), seawater, or any combination thereof. In many embodiments, the aqueous fluids include one or more ionic species, such as those formed by salts dissolved in water. For example, seawater and/or produced water may include a variety of divalent cationic species dissolved therein. In some embodiments, the density of the aqueous fluid can be adjusted, among other purposes, to provide additional particulate transport and suspension in the compositions. In some embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate. In some embodiments, the treatment fluid may include a mixture of one or more aqueous fluids with other fluids and/or gases, including but not limited to emulsions, foams, and the like. As an example, an alcohol such as methanol, ethanol, or propanol, particularly ethanol, can be used in combination with or instead of the aqueous fluid.

In some embodiments, the treatment fluid can include any suitable version of the binder composition described above and a carrier fluid including an aqueous fluid, ethanol, or a combination thereof. Generally, the aqueous fluid and ethanol have a miscibility ranging from aqueous fluid to ethanol of 99 parts: 1 part to 1 part: 99 parts, and the mixture does not phase separate at any concentration at a temperature range of about −20 °C to about 250 °C. In some aspects, the carrier fluid can include an aqueous fluid comprising fresh water, salt water (e.g., water containing one or more salts dissolved therein), brine (e.g., saturated salt water), seawater, or a combination thereof. Generally, the treatment fluid can be substantially absent of an amine, a silane, a siloxane, or a combination thereof In some embodiments, the binder composition can further include a gelling agent, a friction reducer, a crosslinker, a surfactant, a foaming agent, such as environmentally compatible foamers, a stabilizer, or any combination thereof for forming a fracturing fluid.

The salt-substituted clay stabilizer can be selected from choline chloride, choline hydroxide, choline bitartrate, tricholine citrate, choline bicarbonate, or any combination thereof. The salt-substituted clay stabilizer can be a quaternary ammonium compound selected from compounds described in patent publications US 2004/0235677 and U.S. Pat. No. 9,738,823. Other salt-substituted clay stabilizers can also be selected including compounds described in U.S. Pat. Nos. 7,284,610 and U.S. Pat. No. 11,084,974.

The salt-substituted clay stabilizer can be one or more inorganic salts such as NaCl, KCl, or $CaCl_2$. The salt-substituted clay stabilizer can be an amine-based clay control additives such as ammonium chloride, ammonium acetate, ammonium hydroxide, tetraalkyl ammonium chloride (tetramethylammonium chloride, tetraethylammonium chloride, and the like), tetraalkylammonium hydroxide (tetrabutylammonium hydroxide, and the like), and polymers of the associated species. The salt-substituted clay stabilizer can be a bis-quaternary amine (e.g., N,N,N,N',N',N'-trimethyl-1,3-diamino-2-propanol dichloride), a poly-bis-quaternary amine (e.g., poly {N-(N',N',N'-trimethyl,N",N"-dimethyl-4,6-diamino-5-propanol)-3-propyl]-2-methylpropanamide dichloride}), and the like.

In some embodiments, the treatment fluid may be foamed. In some embodiments, the treatment fluid may be a pill optionally foamed. One advantage of using a foamed pill over a non-foamed version is that less of the aqueous fluid may be used, relatively speaking. This may be important in subterranean formations that are water-sensitive or under pressure. In some embodiments, the foamed pills have a foam quality of about 30% or above. These pills may include commingled fluids. A preferred foam quality level is about 50% or above.

When the pill is foamed, the pill may comprise an additional surfactant. The choice of whether to use an additional surfactant will be governed at least in part by the mineralogy of the formation and the composition of the viscoelastic surfactant. As will be understood by those skilled in the art, anionic, cationic, nonionic, or amphoteric surfactants also may be used so long as the desired foaming properties are displayed under the conditions. For example, in some embodiments, mixtures of cationic and amphoteric surfactants may be used. When used in some pill embodiments, the surfactant is present in an amount of from about 0.01% to about 5% by volume. When foamed, the base fluid may comprise a gas. While various gases can be utilized for foaming the pills, nitrogen, carbon dioxide, and mixtures thereof are preferred. In examples of such embodiments, the gas may be present in a base fluid and/or a delayed tackifying composition in an amount in the range of from about 5% to about 95% by volume, and more preferably in the range of from about 20% to about 80%. The amount of gas to incorporate into the fluid may be affected by factors including the viscosity of the fluid and bottomhole pressures involved in a particular application. Examples of preferred foaming agents that can be utilized to foam the base fluid and/or the delayed tackifying composition include, but are not limited to, alkylamidobetaines such as cocoamidopropyl betaine, alpha-olefin sulfonate, trimethyltallowammonium chloride, $C_8$ to $C_{22}$ alkylethoxylate sulfate, and trimethylcocoammonium chloride. Other suitable foaming agents and foam-stabilizing agents may be included as well such as sultaines and/or alkylpolyglycosides, which will be known to those skilled in the art with the benefit of this disclosure. The foaming agent is generally present in a pill for some embodiments in an amount in the range of from about 0.01% to about 5%, by volume, more preferably in the amount of from about 0.2% to about 1%, and most preferably about 0.6% by volume.

In some embodiments, one or more surfactants may be added to the treatment fluid with or absent a foaming agent. In such embodiments, the one or more surfactants may enhance or improve penetration of the treatment fluid. In some embodiments, the one or more surfactants may be a nonionic or an ionic surfactant. Examples of suitable nonionic surfactants include, but are not limited to, alkoxylated linear alcohols, alkoxylated alkyl phenols, fatty acid esters, amine and amide derivatives, alkylpolyglucosides, ethylene oxide and propylene oxide copolymers polyalcohols and alkoxylated polyalcohols, and any combination thereof. Ionic surfactants can be cationic and anionic surfactants. Cationic surfactants that may be suitable for certain embodiments include, but are not limited to, arginine methyl esters, alkanolamines, alkylenediamines, alkyl amines, alkyl amine salts, quaternary ammonium salts such as trimethyltallowammonium chloride, amine oxides, alkyltrimethyl amines, triethyl amines, alkyldimethylbenzylamines, alkylamidobetaines such as cocoamidopropyl betaine, alpha-olefin sulfonate, $C_8$ to $C_{22}$ alkylethoxylate sulfate, trimethylcocoammonium chloride, derivatives thereof, and combinations thereof, for example. Types of anionic surfactants that may be suitable for certain embodiments of the present disclosure include, but are not limited to, alkali metal alkyl sulfates, alkyl ether sulfonates, alkyl sulfonates, alkylaryl sulfonates, linear and branched alkyl ether sulfates and sulfonates, alcohol polypropoxylated sulfates, alcohol polyethoxylated sulfates, alcohol polypropoxylated polyethoxylated sulfates, alkyl disulfonates, alkylaryl disulfonates, alkyl disulfates, alkyl sulfosuccinates, alkyl ether sulfates, linear and branched ether sulfates, alkali metal carboxylates, fatty acid carboxylates, phosphate esters alkyl carboxylates, alkylether carboxylates, N-acylaminoacids, N-acylglutamates, N-acylpolypeptides, alkylbenzenesulfonates, paraffinic sulfonates, a-olefinsulfonates, lignosulfates, derivatives of sulfosuccinates, polynapthylmethylsulfonates, alkylsulfates, alkylethersulfates, monoalkylphosphates, polyalkylphosphates, fatty acids, alkali salts of acids, alkali salts of fatty acids, alkaline salts of acids, sodium salts of acids, sodium salts of fatty acid, alkyl ethoxylate, soaps, derivatives thereof, and combinations thereof, for example.

In some embodiments, a method of servicing a well having a wellbore extending from a surface wellsite and penetrating a subterranean formation can include (i) contacting a binder composition with particulate material; and (ii) binding the particulate material with the binder composition to form consolidated particulate material in the wellbore, in the formation, or both. Generally, the binder composition may include a poly-epoxy glycerol-based oil, a crosslinker, and a soluble organic acid with two or more acid groups. In some alternative embodiments, a method of servicing a well having a wellbore extending from a surface wellsite and penetrating a subterranean formation can include forming a consolidated particulate material in the wellbore, in the formation, or both via contact with the binder composition as described above, the treatment fluid as described above, or both.

In some embodiments, the (i) contacting occurs at the surface and the particulate material comprises proppant (e.g., micro-proppant, fracturing sand, proppant particulates, or combinations thereof). The contacting can provide a dry coating or a wet coating with a primary treatment at the surface and remediation downhole.

In some embodiments, the proppant can be dry coated with a sand screw on a fracturing pad at the surface. Generally, the method can further include contacting the dry proppant (e.g., dry micro-proppant, dry fracturing sand, dry proppant particulates, or combinations thereof) with the binder composition to form coated proppant (e.g., treated with or at least partially coated with the binder composition). Afterwards, the method can include forming a proppant-laden fracturing fluid comprising the coated proppant and a carrier fluid. That being done, the proppant-laden fracturing fluid via the wellbore may be pumped into fractures of the subterranean formation and the coated proppant can be deposited into at least a portion of the fractures prior to the (ii) binding.

In some embodiments, the proppant can be wet coated by combining ingredients in a blender tub on a fracturing pad at the surface. The (i) contacting may further include combining an aqueous carrier fluid, the proppant, and the binder composition to form a proppant-laden fracturing fluid including coated proppant. Moreover, the proppant-laden fracturing fluid via the wellbore can be pumped into at least a portion of the fractures, and the coated proppant can be deposited into at least a portion of the fractures prior to the (ii) binding.

In some embodiments, the proppant can be coated with a combination of dry and wet coatings. As an example, a liquid first component of a binder composition can be contacted with dry proppant (e.g., dry micro-proppant, dry fracturing sand, dry proppant particulates, or combinations thereof) to form pre-treated proppant. Afterwards, a carrier fluid, the pre-treated proppant and a second component of the binder composition can be combined to form a proppant-laden fracturing fluid comprising coated proppant. Generally, the first component of the binder composition can include the poly-epoxy glycerol-based oil and the soluble organic acid with two or more acid groups or the crosslinker. Moreover, the second component of the binder composition may include the poly-epoxy glycerol-based oil and the soluble organic acid with two or more acid groups or the crosslinker. Typically, the first component of the binder composition is different than the second component of the binder composition. Afterwards, the proppant-laden fracturing fluid via the wellbore can be pumped into at least a portion of the fractures, and the coated proppant may be deposited into at least a portion of the fractures.

In some embodiments, the (i) contacting can occur downhole, such as a downhole remediation process. In such instances, the particulate material can include: (a) proppant (e.g., micro-proppant, fracturing sand, proppant particulates, or combinations thereof) deposited in fractures of the subterranean formation (e.g., consolidation of proppant bed/pack for flowback control); (b) formation particulates (e.g., consolidation of formation sands and formation fines, for example in weakly consolidated, unconsolidated, or clay-laden intervals of the formation); (c) gravel, sand, or both adjacent a sand control screen (e.g., consolidation of sand screen completion); (d) particulates adjacent to a face, surface, or wall of the wellbore (e.g., consolidation while drilling through production zone in unconsolidated, weakly consolidated, or clay-laden interval of the formation); (e) particulates adjacent to a face or surface of the fracture (e.g., consolidation while fracturing in unconsolidated, weakly consolidated, or clay-laden interval of the formation); or (f) any combination of (a)-(e).

After (i) contacting, the particulate material can form a consolidated material downhole with the binder composition. In some aspects, the consolidated material may include a consolidated proppant pack.

In some embodiments, the binder composition can be placed downhole. In such instances, the treatment fluid including the binder composition and a carrier fluid is foamed, is an emulsion, or both. In some aspects, the treatment fluid can include a first aqueous component comprising the poly-epoxy glycerol-based oil and the soluble organic acid with two or more acid groups and a second aqueous component comprising the crosslinker. In some embodiments, the (i) contacting may include sequentially contacting at least a portion of the proppant present in fractures of the subterranean formation with the first aqueous component including the poly-epoxy glycerol-based oil and the soluble organic acid with two or more acid groups followed by an optional spacer fluid, followed by the second aqueous component including the crosslinker. Alternatively in some other embodiments, the (i) contacting may include sequentially contacting at least a portion of the proppant present in fractures of the subterranean formation with the second aqueous component comprising the crosslinker followed by an optional spacer fluid followed by the first aqueous component comprising the poly-epoxy glycerol-based oil and the soluble organic acid with two or more acid groups. In still other embodiments, the (i) contacting may include simultaneously contacting at least a portion of the proppant present in fractures of the subterranean formation with the first aqueous component comprising the poly-epoxy glycerol-based oil and the soluble organic acid with two or more acid groups and the second aqueous component comprising the crosslinker.

In some embodiments, the binder composition can be coated onto particulate material (e.g., proppant such as sand) and the coated material can be placed downhole (e.g., pumped downhole in treatment fluid such as a proppant laden slurry). The binder composition can be placed on the proppant material prior to forming the treatment fluid (e.g., the binder composition can be sprayed onto the particulate material, for example while the particulate material is being moved on a conveyor, being augered by a sand screw, or while the particulate material is being stored at the wellsite before mixing to form the treatment fluid). The binder composition can be placed on the proppant material concurrent with forming the treatment fluid. For example, components of the binder composition (e.g.,) can be combined with particulate material in a blender or mixer tub along with sufficient excess water to form a pumpable treatment fluid (e.g., proppant laden slurry). The method can further include contacting one or more additives including a gelling agent, a friction reducer, an additional crosslinker, or any combination thereof with the treatment fluid comprising the coated particulate material.

In some embodiments, the binder composition can be applied to in situ to particulate material present in the wellbore and/or surrounding formation. Such particulate material can be consolidated in place downhole via contact with the binder composition, and such particulate material can include sand, fines, gravel (e.g., gravel pac), proppant (e.g., consolidated proppant pack), or any combination thereof.

Suitable proppants include, but are not limited to, sand, bauxite, a ceramic, a glass, a polymer, polytetrafluoroethylene, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material where suitable filler materials include silica, alumina, fumed carbon, carbon black, graphite, mica, titanium dioxide, barite, meta-silicate, calcium silicate, kaolin, talc, zirconia, boron, fly ash, hollow glass microspheres, solid glass, and combinations thereof. Suitable proppant particles may be any known shape of material, including substantially spherical materials, fibrous materials, polygonal materials (such as cubic materials), and combinations thereof. Moreover, fibrous materials, that may or may not be used to bear the pressure of a closed fracture, may be included in certain embodiments.

In some embodiments, the binder composition can be placed downhole or mixed with particulates, such as sand particulates. The method can further include separately placing components of the binder composition downhole, for example by mixing the poly-epoxy glycerol-based oil with the carrier fluid to form a first part and mixing the soluble organic acid with two or more acid groups with the carrier fluid to form a second part, and separately placing the first and second parts downhole where they combine in the presence of the crosslinker (either included in the first part, the second part, or added separately) to form the binder composition and contact/consolidate particulate material present in the wellbore, the surrounding formation, or both.

The method can further include placing the particulate material downhole, placing the binder composition downhole (e.g., the poly-epoxy glycerol-based oil, the soluble organic acid with two or more acid groups, the crosslinker, the carrier fluid, and optionally a surfactant downhole), and contacting the binder composition and with the particulate material to form consolidated material. The poly-epoxy glycerol-based oil, the soluble organic acid with two or more acid groups, the crosslinker, and the carrier fluid can combine to form the binder composition and contact the particulate material downhole for a predetermined period of time to consolidate the particulate material. The placing of the binder composition may be conducted proximate to drilling, treating, producing, or fracturing the subterranean formation to facilitate the binder composition consolidating the particulate material, which may include in situ particulate material.

In some embodiments, the method, such as drilling or secondary operations, such as fracturing, may further include placing the poly-epoxy glycerol-based oil downhole, and then placing the soluble organic acid with two or more acid groups and crosslinker downhole. The carrier fluid, the poly-epoxy glycerol-based oil, the soluble organic acid with two or more acid groups, and the crosslinker can react to form the binder composition, and contact and consolidate the particulate material placed downhole. In some embodiments, the method can further include placing a spacer after placing the poly-epoxy glycerol-based oil to prevent contact with the soluble organic acid with two or more acid groups and/or crosslinker. The placing of at least one material of the binder composition may be conducted proximate to drilling or fracturing the subterranean formation. The particulate material can be in situ.

In some embodiments, such as those applying to operations for placing a treating fluid downhole, the placing of the treatment fluid can be conducted in one or more steps and the placing of the poly-epoxy glycerol-based oil, the soluble organic acid with two or more acid groups, and the crosslinker may be combined with a carrier fluid to form the binder composition and placed downhole in one or more steps. The method may further include contacting the binder composition and the particulate material for a predetermined amount of time to consolidate the particle material. The placing of at least one material of the binder composition can be conducted proximate to treating the subterranean formation. In some embodiments, the carrier fluid can be combined with the poly-epoxy glycerol-based oil, the soluble organic acid with two or more acid groups, and the crosslinker to form a binder composition and comprised in a drill-in fluid, and further including placing the drill-in fluid downhole, and permeating the subterranean formation with the drill-in fluid during production intervals to consolidate the particulate material in the subterranean formation.

In some embodiments, the method being applicable to, e.g., drilling or secondary operations, such as fracturing, may further include combining the poly-epoxy glycerol-based oil, the soluble organic acid with two or more acid groups, the crosslinker, a carrier fluid, and optionally a surfactant to form the binder composition, and placing the binder composition downhole in one or more steps to contact the particulate material (e.g., a proppant pack) for a predetermined amount of time. The method can further comprise placing another particulate material downhole, placing another binder composition downhole, placing a gelling agent and/or a friction reducing agent downhole, or a combination thereof. The placing of at least one material can be conducted proximate to producing, or fracturing the subterranean formation.

In some embodiments, a method of servicing a subterranean formation penetrated by a wellbore can include combining an alkali metal silicate, a dehydrating-activator agent and a carrier fluid to form a binder composition, contacting the binder composition with a particulate material, adhering the binder composition to the particulate material to form a composite material, and placing the composite material downhole (e.g., in a pumpable slurry). The method can further include prior to forming the binder composition, fracturing the wellbore to produce a plurality of fractures, and prior to adhering, suspending the contacted particulate material in the treatment fluid (e.g., a proppant laden fracturing fluid). The method can further include after placing the composite material downhole, depositing the composite material in the plurality of fractures, curing the binder composition of the composite material, and consolidating the particulate material to form permeable, consolidated complexes to fix the particulate material in the wellbore, the subterranean formation, or both.

The treatment fluid including the binder composition can provide a system that meets health, safety, and environment requirements in various regions, such as the North Sea and European countries. The treatment fluid can include an organic agent that can be environmentally compatible. The treatment fluids have a great variety of uses, such as treatment for sand control, fines migration control, and proppant flowback control based on the desirable consolidation strengths of the treated particulates.

In some embodiments, the treatment fluid can be foamed for enhancing effective placement in long intervals of formation sand, or of propped fractures, with highly contrast permeabilities. The treatment fluid can have a high flashpoint and low viscosity similar to water. Low viscosity permits placement in the targeted zone easier than existing high viscosity resin systems. Moreover, the treatment fluid is useable over a wide range of temperatures, provides high consolidation strengths to treated particulate packs. Additionally, the treatment fluids maintain high regained permeability consolidated sand pack as capillary action tends to pull the binding agent to contact points between particulates to aid maintaining voids in pore spaces.

Figure 2:
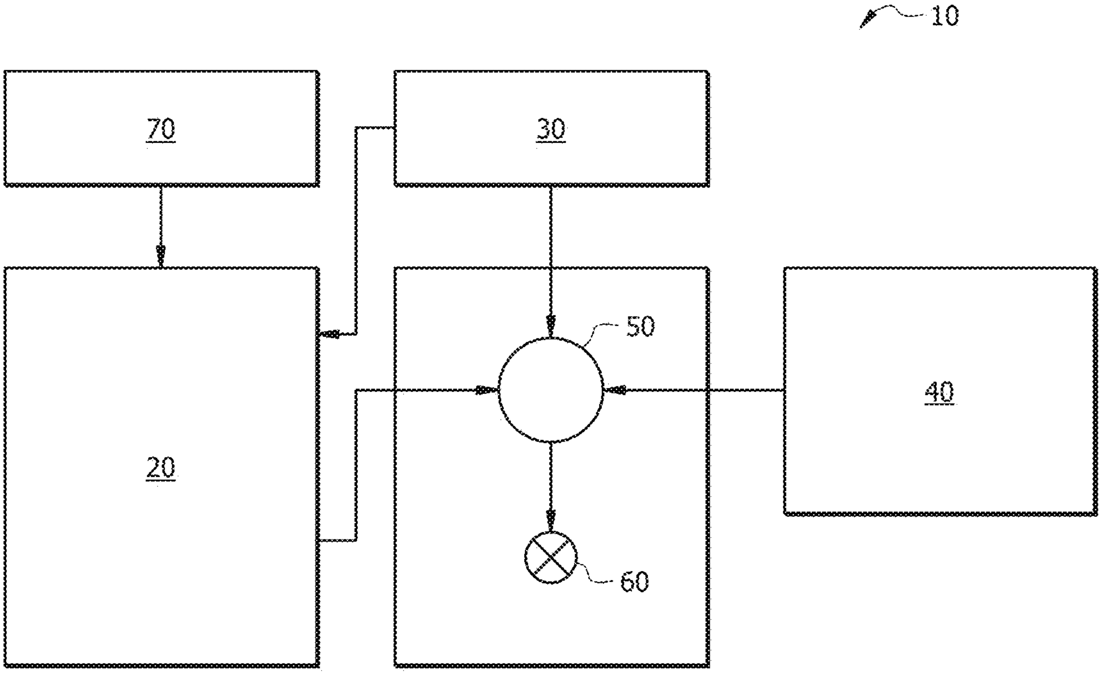
FIG. 2 is a diagram illustrating an example of a fracturing system that may be used in accordance with some embodiments.

Certain embodiments of the methods and compositions disclosed herein may directly or indirectly affect one or more components or pieces of equipment associated with the preparation, delivery, recapture, recycling, reuse, and/or disposal of the disclosed compositions. For example, and with reference to FIG. 2, the disclosed methods and compositions may directly or indirectly affect one or more components or pieces of equipment associated with an exemplary fracturing system 10, according to one or more embodiments that involve fracturing treatments or the treatment of pre-existing fractures. In certain instances, the system 10 includes a fracturing fluid producing apparatus 20, a fluid source 30, a proppant source 40, and a pump and blender system 50 and resides at the surface at a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise water, a hydrocarbon fluid, a polymer gel, foam, air, wet gases and/or other fluids.

The proppant source 40 can include a proppant (e.g., microproppant material or larger proppant particulates) for combination with the fracturing fluid. The system may also include additive source 70 that provides one or more additives (e.g., the silicate components, aluminum components, and/or alkali sources, as well as gelling agents, weighting agents, and/or other optional additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions.

The pump and blender system 50 receives the fracturing fluid and combines it with other components, including proppant from the proppant source 40 and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 to source from one, some or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just proppants at other times, and combinations of those components at yet other times.

Figure 3:
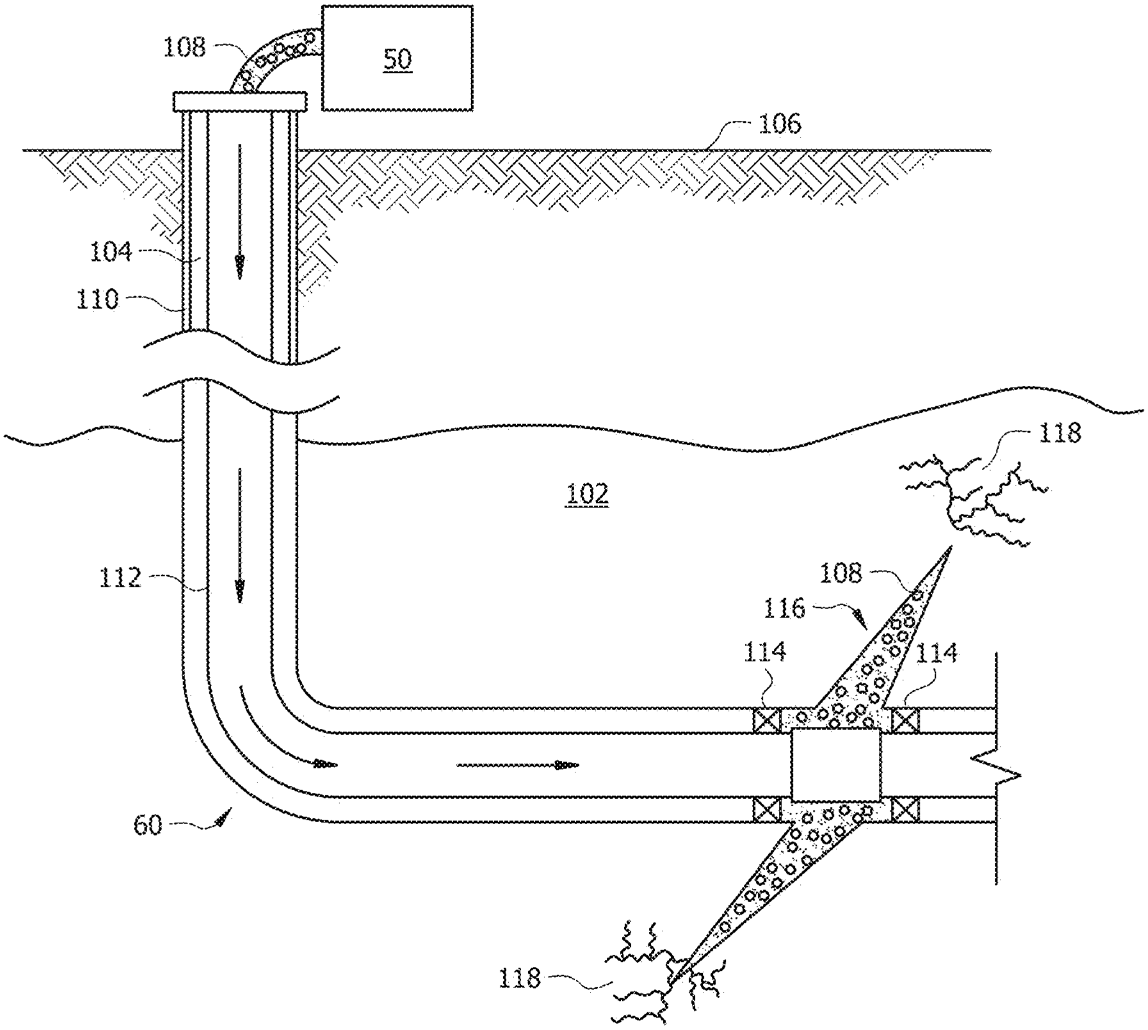
FIG. 3 is a diagram illustrating an example of a subterranean formation in which a fracturing operation may be performed in accordance with some embodiments.

FIG. 3 shows the well 60 during a fracturing operation in a portion of a subterranean formation of interest 102 surrounding a well bore 104. The well bore 104 extends from the surface 106, and the fracturing fluid 108 is applied to a portion of the subterranean formation 102 surrounding the horizontal portion of the well bore. Although shown as vertical deviating to horizontal, the well bore 104 may include horizontal, vertical, slant, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro-jetting and/or other tools.

The well is shown with a work string 112 depending from the surface 106 into the well bore 104. The pump and blender system 50 is coupled a work string 112 to pump the fracturing fluid 108 into the well bore 104. The working string 112 may include coiled tubing, jointed pipe, and/or other structures that allow fluid to flow into the well bore 104. The working string 112 can include flow control devices, bypass valves, ports, and or other tools or well devices that control a flow of fluid from the interior of the working string 112 into the subterranean zone 102. For example, the working string 112 may include ports adjacent the well bore wall to communicate the fracturing fluid 108 directly into the subterranean formation 102, and/or the working string 112 may include ports that are spaced apart from the well bore wall to communicate the fracturing fluid 108 into an annulus in the well bore between the working string 112 and the well bore wall.

The working string 112 and/or the well bore 104 may include one or more sets of packers 114 that seal the annulus between the working string 112 and well bore 104 to define an interval of the well bore 104 into which the fracturing fluid 108 will be pumped. FIG. 3 shows two packers 114, one defining an uphole boundary of the interval and one defining the downhole end of the interval. When the fracturing fluid 108 is introduced into well bore 104 (e.g., in FIG. 3, the area of the well bore 104 between packers 114) at a sufficient hydraulic pressure, one or more fractures 116 may be created in the subterranean zone 102. In certain embodiments, the fracturing fluid 108 may include one or more of the poly-epoxy glycerol-based oil, the soluble organic acid with two or more acid groups, and the cross-linker, which may facilitate the formation of geopolymers on the fracture faces within fractures 116 according to the methods described therein. The proppant particulates in the fracturing fluid 108 may enter the fractures 116 where they may remain after the fracturing fluid flows out of the well bore. These proppant particulates may "prop" fractures 116 such that fluids may flow more freely through the fractures 116. Additionally, one or more microfractures 118 branching off of and in communication with fractures 116 may be created in a similar fashion. In certain embodiments, the fracturing fluid 108 may include one or more of the poly-epoxy glycerol-based oil, the soluble organic acid with two or more acid groups, and the crosslinker, which may facilitate the formation of geopolymers on the fracture faces within microfractures 118 according to the methods described therein.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

EXAMPLES

The embodiments having been generally described, the following examples are given as particular embodiments of the disclosure and to demonstrate the practice and advantages thereof. It is understood that the examples are given by way of illustration and is not intended to limit the specification or the claims in any manner.

A series of experiments conducted at Halliburton's Technology Center in Houston were performed at different temperatures providing over displacement fluid (ODF) and unconfined consolidation strength (UCS) measurements. The ODF test pumps additional fluid, such as an aqueous solution of high molecular weight polyacrylamide friction reducers, such as slickwater or fractionation fluid absent proppant, but with polymer, in amounts greater than necessary to pass excess fluid though a sand pack and measure the amount of material removed by washing the fluid flow through the sand pack. The UCS test, also sometimes referred to as uniaxial compression test, can assess the strength of a cylindrical sand sample under zero confining stress measured in kilopascals (kPa). A loading device consistently applies a load at a required rate via two plates transferring axial stress to the specimen.

Uncoated 30/50 mesh sand particles are treated with a 3 wt. % of an amine-free binder composition. Results depicted Table 1 show that reaction time may be more significant than reaction temperature.

TABLE 1

| Example | PEGO | Cross-linker PPA (ml) | SOA | Binder Coating | Sand Mesh (g) | ODF FR (ml) | AA | Cure Temp. °F(°C) | Cure Time Days | UCS kPa |
|---|---|---|---|---|---|---|---|---|---|---|
| 1 | Soy-bean Oil | Tannic Acid | Malic Acid | 3% | 30/50 (100) | 125 | None | 200 (93) | 12 | 115 |
| 2 | Soy-bean Oil | Tannic Acid | Malic Acid | 3% | 30/50 (100) | 125 | Silane | 300 (150) | 4 | 78 |
| 3 | Soy-bean Oil | Tannic Acid | Malic Acid | 3% | 30/50 (100) | 125 | None | 300 (150) | 4 | 33 |

Some of the abbreviations presented in TABLE 1 above are as follows: FR means a friction reducer that is a high molecular weight polyacrylamide; 30/50 means a 30/50 mesh permitting 300 to 700 micron particles to pass through; PEGO means poly epoxy glycerol-based oil; PPA means polyphenolic acid; SOA means soluble organic acid; AA means adhesion aid, and Temp. means temperature in degrees Fahrenheit (°F) and Celsius (°C).

Figure 4:
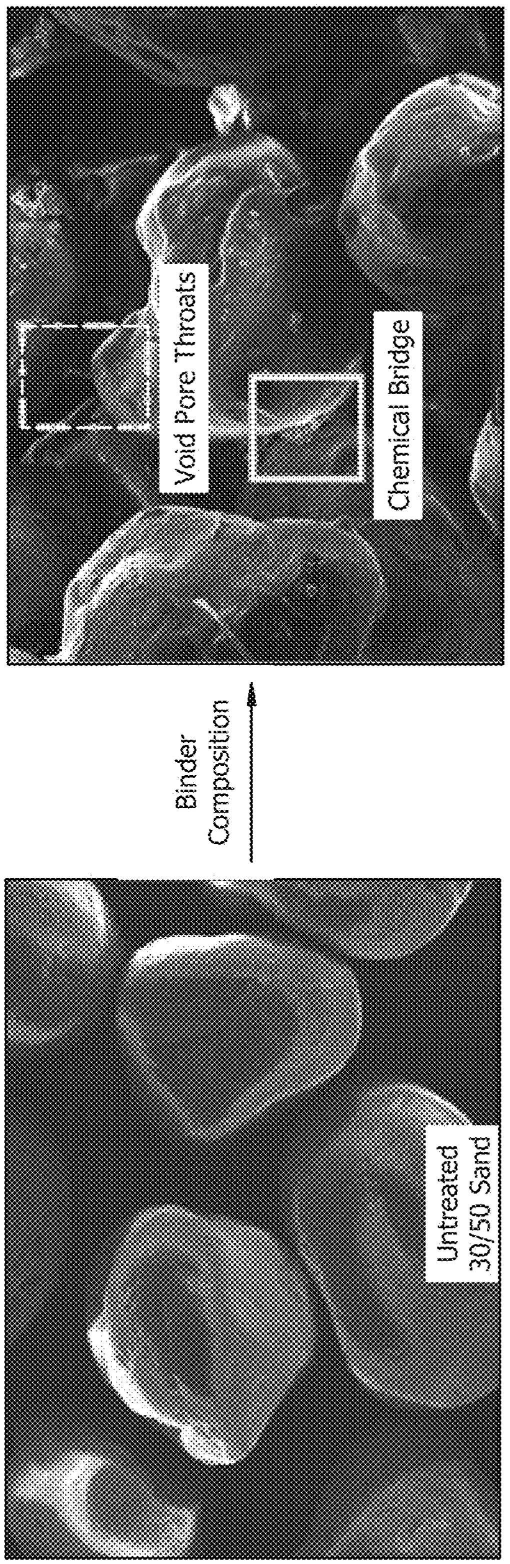
FIG. 4 are SEM images of untreated sand particles and treated sand particles in accordance with some embodiments.

Referring to FIG. 4, SEM images clearly show a chemical cohesion bridge between coated sand grains using a binder composition as depicted above as Example 1 in Table 1. Thus, sand grains are consolidated. In addition, to address regain permeability, the images reveal void spaces between coated sand particles. Thus, the binder composition is particularly suited for consolidating particles in a wellbore environment or surrounding formation.

The employment of a tannin, such as a tannic acid, in combination with epoxidated soybean oil generally has not been deposited in a subterranean formation, much less for consolidation of formation sands or proppant materials present in a hydrocarbon-bearing well. Thus, the oil and gas industry may not have to date a chemical sand control offering that is REACH approved or can meet the stringent environmental constraints (PLONOR) to be pumped in the North Sea.

A chemical consolidation offering that is composed of biomolecules and provides sufficient particle adhesion via a biomimetic process can likely provide a formulation suitable for North Sea applications. Furthermore, this type of composition has the capability to utilize biomaterials having lower carbon footprint when sourced from biosynthetic processes or directly off biological sources.

The following enumerated embodiments are non-limiting examples of the subject matter of the present disclosure:

A first embodiment, which is a binder composition, comprises a poly-epoxy glycerol-based oil; a crosslinker; and a soluble organic acid with two or more acid groups, wherein the binder composition has an activation temperature in a broadest range of from about 25 °C to about 400 °C; in an intermediate range of from about 45 °C to about 180 °C; or in a preferred range of from about 50 °C to about 93 °C.

A second embodiment which is the binder composition of the first embodiment, wherein the activation temperature is less than or equal to about 250 °C, about 240 °C, about 230 °C, about 220 °C, about 210 °C, about 200 °C, about 190 °C, about 180 °C, about 170 °C, about 160 °C, about 150 °C, about 140 °C, about 130 °C, about 120 °C, about 110 °C, about 100 °C, about 90 °C, about 80 °C, about 70 °C, about 60 °C, about 50 °C, about 40 °C, or about 30 °C, and the activation temperature is greater than or equal to about 25 °C, about 30 °C, about 40 °C, about 50 °C, about 60 °C, about 70 °C, about 80 °C, about 90 °C, about 100 °C, about 110 °C, about 120 °C, about 130 °C, or about 140 °C.

A third embodiment which is the binder composition of the first embodiment or the second embodiment, wherein the crosslinker comprises a terrestrial plant derived tannin or derivative thereof, such as gallotannins, ellagitannins, and/or proanthocyanidins; a sea plant, e.g., brown algae, derived tannin or derivative thereof, such as phlorotannins; a phloroglucinol; tannic acid; a plant derivative, such as a polyphenol; a polyphenol comprising one or no terminal acid groups; a polyphenol comprising one or no terminal carboxylic acid groups; an amino acid preferably comprising a phenolic moiety; or a combination thereof.

A fourth embodiment which is the binder composition of any of the first to third embodiments wherein the crosslinker comprises a polyphenol.

A fifth embodiment which is the binder composition of any of the first to fourth embodiments wherein the polyphenol comprises a flavonoid, a stilbene, a lignan, a phenolic acid, a tannin, or a combination thereof.

A sixth embodiment which is the binder composition of the fifth embodiment, wherein the polyphenol comprises the tannin, and the tannin comprises tannic acid.

A seventh embodiment which is the binder composition of any of the first to sixth embodiments wherein the crosslinker comprises catechol, pyrogallol, hydroxyquinol, phloroglucinol, 1,2,4-benzenetriol, 1,2,3,4-tetrahydroxybenzene, 2,4,5-trihydroxybenzoic acid, 3,4,5-trihydroxybenzoic acid, such as gallic acid, a tannic acid, 2,3,4-trihydroxybenzoic acid, 2,3-dihydroxybenzoic acid, 3,4-dihydroxybenzoic acid, 6,7-dihydroxycoumarin, an ellagic acid, an urushiol, a chlorogenic acid, a caffeic acid, a flavanol, a flavonodid, a catechin, an anthocyanidin, an isoflavanoid, an amino acid comprising a phenolic moiety, or a combination thereof.

An eighth embodiment which is the binder composition of any of the first to seventh embodiments wherein the crosslinker comprises a tannic acid.

A ninth embodiment which is the binder composition of any of the first to eighth embodiments wherein the binder composition is substantially absent an amine compound, a silane compound, or a combination thereof.

A tenth embodiment which is the binder composition of any of the first to ninth embodiments wherein the crosslinker is substantially absent of an amine crosslinker, an aminosilane docking agent, or a combination thereof.

An eleventh embodiment which is the binder composition of any of the first to tenth embodiments wherein the crosslinker includes a terrestrial plant derived tannin or derivative thereof, such as gallotannins, ellagitannins, and/or proanthocyanidins; a sea plant, e.g., brown algae, derived tannin or derivative thereof, such as phlorotannins; a phloroglucinol; tannic acid; a plant derivative, such as a polyphenol; a polyphenol comprising one or no terminal acid groups; a polyphenol comprising one or no terminal carboxylic acid groups; or an amino acid preferably comprising a phenolic moiety; or a combination thereof.

A twelfth embodiment which is the binder composition of any of the first to eleventh embodiments wherein the two or more acid groups of the soluble organic acid are two or more carboxylic acid groups.

A thirteenth embodiment which is the binder composition of any of the first to twelfth embodiments wherein the poly-epoxy glycerol-based oil comprises at least two epoxide groups, such as an epoxidated soy bean oil.

A fourteenth embodiment which is the binder composition of any of the first to thirteenth embodiments wherein the poly-epoxy glycerol-based oil comprises an epoxidated terpene, an epoxidated terpenoid, a dimerized epoxidated terpene, a dimerized epoxidated terpenoid, a trimerized epoxidated terpene, a trimerized epoxidated terpenoid, an epoxidated oligomeric terpene, an epoxidated oligomeric terpenoid, a polymerized epoxidated terpene, a polymerized epoxidated terpenoid, a limonene oxide, an epoxidated poly-(polyene-oxide-isoprene-oxide), an epoxidated copolymer of poly-(butadiene oxide)-co-polybutadiene, an epoxidated farnesene, an epoxidated mircene, an epoxidated bisabolene, an epoxidated terpinolene, an epoxidated terpinol, an epoxidated eleostearic acid, an epoxidated acid linoleic, an epoxidated linolenic acid, an epoxidated linseed oil, an epoxidated tung oil, an epoxidated soybean oil, an epoxidated peanut oil, an epoxidated avocado oil, an epoxidated sunflower oil, an epoxidated corn oil, an epoxidated cottonseed oil, an epoxidated palm oil, an epoxidated soybean oil, an epoxidated canola oil, an epoxidated linseed oil, an epoxidated soy methylester, an epoxidated linseed methyl ester, an epoxidated tall oil fatty acid (TOFA), an epoxidated acetylated-triacylglycerol, an epoxidated acetylated-diacylglycerol, an epoxidated acetylated-monoacylglycerol, an epoxidated jojoba oil, an epoxidated 2-ethylhexyl soyate, an epoxidated 2-ethylhexyl TOFA, an epoxidated isoamyl soyate, an epoxidated isoamyl palm stearin, an epoxidated isoamyl TOFA, an epoxidated isoamyl soyate, an epoxidated soy methyl ester acetic acid estolide, a glycerol diglycidyl ether, a glycerol triglycidyl ether, a sorbitol epoxidated, a sorbitol diglycidyl ether, a sorbitol triglycidyl ether, a sorbitol tetraglycidyl ether, a sorbitol pentaglycidyl ether, a sorbitol hexaglycidyl ether, a diglycidyl ether, a cyclohexananidanyl bisphenol A hydrogenated diglicidyl ether, a neopentyl glycol diglycidyl ether, an ethylene glycol diglycidyl ether, a 1,4-butanediol diglycidyl ether, a tetraethylene glycol diglycidyl ether, a polydimethyl siloxane diglycidyl ether, an epoxidated grapefruit mercaptan, a bisphenol A diglycidyl ethoxylated ether, a bisphenol A diglycidyl ethoxylated ether, a cyclohexanedimethanol diglycidyl ethoxylated ether, or a combination thereof.

A fifteenth embodiment which is the binder composition of any of the first to fourteenth embodiments wherein the poly-epoxy glycerol-based oil comprises an epoxidated soybean oil, an epoxidated linseed oil, an epoxidated hemp oil, an epoxidated perilla oil, a fraction thereof, or a combination thereof.

A sixteenth embodiment which is the binder composition of any of the first to fifteenth embodiments wherein an unsaturated oil precursor of the poly-epoxy glycerol-based oil comprises an açai oil, an almond oil, an amaranth oil, an apple seed oil, an apricot oil, an argan oil, an avocado oil, a babassu oil, a beech nut oil, a ben oil, a bitter gourd oil, such as from one or more seeds of *Momordica charantia*, a black seed oil, a blackcurrant seed oil, such as from one or more seeds of *Ribes nigrum*, a borage seed oil, such as from one or more seeds of seeds of *Borago officinalis*, a borneo tallow nut oil, a bottle gourd oil, such as from one or more seeds of seeds of *Lagenaria siceraria*, a buffalo gourd oil, such as from one or more seeds of *Cucurbita foetidissima*, a butternut squash seed oil, such as from one or more seeds of *Cucurbita moschata*, a camelina sativa oil, a cape chestnut oil, such as a yangu oil, a carob pod oil, a cashew oil, a cocklebur oil, a cocoa butter, a coconut oil, a cohune oil, a coriander seed oil, a corn oil, a cottonseed oil, a date seed oil, a dika oil, an egusi seed oil, such as from one or more seeds of *Cucumeropsis mannii naudin*, an evening primrose oil, such as from one or more seeds of *Oenothera biennis*, a flaxseed oil, such as from one or more seeds of *Linum usitatissimum*, a grape seed oil, a grapefruit seed oil, a hazelnut oil, a hemp oil, a kapok seed oil, a kenaf seed oil, such as from one or more seeds of *Hibiscus cannabinus*, a *lallemantia* oil, such as from one or more seeds of *Lallemantia iberica*, a linseed oil, a macadamia oil, a mafura oil, such as from one or more seeds of *Trichilia emetic*, a manila oil, such as from one or more kernels of *Sclerocarya birrea*, a meadowfoam seed oil, a mongongo nut oil, such as a manketti oil, a mustard oil, a niger seed oil, an okra seed oil, an olive oil, an orange oil, a palm oil, a papaya seed oil, a peanut oil, a pecan oil, a pequi oil, such as from one or more seeds of *Caryocar brasiliense*, a perilla seed oil, a persimmon seed oil, such as from one or more seeds of *Diospyros virginiana*, a pili nut oil, such as from one or more seeds of *Canarium ovatum*, a pistachio oil, a pomegranate seed oil, a poppyseed oil, a prune kernel oil, a pumpkin seed oil, a quinoa oil, a ramtil oil, such as from *Guizotia abyssinica*or a Niger pea, a rapeseed oil, a rice bran oil, a royal oil, such as from one or more seeds of *Prinsepia utilis*, a safflower oil, a sapote oil, a seje oil, such as from one or more seeds of *Jessenia bataua*, a sesame oil, a shea butter, a soybean oil, a sunflower oil, a taramira oil, a tea seed oil, such as a Camellia oil, a thistle oil, a tigernut oil or a nut-sedge oil, a tobacco seed oil, a tomato seed oil, a walnut oil, a watermelon seed oil, a wheat germ oil, an agarwood oil, an allspice oil, an anise oil, a basil oil, a bay leaf oil, a benzoin oil, a bergamot oil, a buchu oil, a camphor oil, a cannabis oil, a cassia oil, a cedar oil, a celery oil, a chamomile oil, a cinnamon oil, a clary sage oil, a clove oil, a copaiba oil, a cumin oil, an eucalyptus oil, a frankincense oil, a galangal oil, a geranium oil, a ginger oil, a grapefruit oil from, e.g., grapefruit rinds, a guava oil, a hops oil, a hyssop oil, a jasmine oil, a juniper oil, a lavender oil, a lemon oil, a lemongrass oil, a lime oil, a manuka oil, a mandarin orange oil, a marjoram oil, a melaleuca oil, a myrrh oil, a nutmeg oil, an oregano oil, a patchouli oil, a peppermint oil, a pine oil, a rose oil, a rosehip oil, a rosemary oil, a rosewood oil, a sage oil, a sandalwood oil, a sassafras oil, a spearmint oil, a tangerine oil, a tea tree oil, a thyme oil, a tsuga oil, a valerian oil, a vanilla oil, a wintergreen oil, a ylang-ylang oil, a fraction thereof (e.g., one or more components of the oil), or a combination thereof.

A seventeenth embodiment which is the binder composition of any of the first to sixteenth embodiments wherein an unsaturated oil precursor of the poly-epoxy glycerol-based oil comprises a soybean oil, a linseed oil, a hemp oil, a perilla oil, a fraction thereof, or a combination thereof.

An eighteenth embodiment which is the binder composition of any of the first to seventeenth embodiments wherein the poly-epoxy glycerol-based oil comprises an epoxy content of about 1.0 to about 10 milliequivalents per gram (meq/g), preferably about 2.5 to about 8.0 meq/g, and optimally about 4.0 and about 7.5 meq/g.

A nineteenth embodiment which is the binder composition of any of the first to eighteenth embodiments wherein the soluble organic acid with two or more acid groups comprises glycolic acid, lactic acid, hydroxybutyric acid, mandelic acid, malic acid, α-hydroxyglutaric acid, glyceric acid, tartronic acid, quinic acid, 1-hydroxycyclopentanecarboxylic acid, oxalic acid, ellagic acid, or a combination thereof.

A twentieth embodiment which is the binder composition of any of the first to nineteenth embodiments wherein the soluble organic acid with two or more acid groups comprises malic acid.

A twenty-first embodiment which is the binder composition of any of the first to twentieth embodiments wherein the poly-epoxy glycerol-based oil comprises an epoxidated soybean oil; the crosslinker comprises tannic acid; and the soluble organic acid with two or more acid groups comprises malic acid.

A twenty-second embodiment which is a treatment fluid comprising a binder composition of any of the first to twentieth embodiments and a carrier fluid comprising an aqueous fluid, ethanol, or a combination thereof.

A twenty-third embodiment which is the treatment fluid of the twenty-second embodiment, wherein the aqueous fluid and ethanol have a miscibility ranging from aqueous fluid to ethanol of 99 parts: 1 part to 1 part: 99 parts and the fluid does not separate at a temperature range of about −20 °C to about 250 °C.

A twenty-fourth embodiment which is the treatment fluid of the twenty-third embodiment, wherein the carrier fluid comprises an aqueous fluid comprising fresh water, salt water (e.g., water containing one or more salts dissolved therein), brine (e.g., saturated salt water), seawater, or a combination thereof.

A twenty-fifth embodiment which is the treatment fluid of the twenty-second or twenty-fourth embodiment, wherein the treatment fluid is substantially absent of an amine, a silane, a siloxane, or a combination thereof.

A twenty-sixth embodiment which is a method of servicing a well having a wellbore extending from a surface wellsite and penetrating a subterranean formation, comprises: (i) contacting a binder composition with particulate material; and (ii) binding the particulate material with the binder composition to form consolidated particulate material in the wellbore, in the subterranean formation, or both, wherein the binder composition comprises a poly-epoxy glycerol-based oil, a crosslinker, and a soluble organic acid with two or more acid groups.

A twenty-seventh embodiment which is a method of servicing a well having a wellbore extending from a surface wellsite and penetrating a subterranean formation, comprises forming a consolidated particulate material in the wellbore, in the subterranean formation, or both via contact with the binder composition of any of the first to twentieth embodiments, the treatment fluid of any of the twenty-first to twenty-fourth embodiments, or both.

A twenty-eighth embodiment which is the method of the twenty-sixth embodiment, wherein the (i) contacting occurs at the surface and the particulate material comprises proppant (e.g., micro-proppant, fracturing sand, proppant particulates, or combinations thereof).

A twenty-ninth embodiment which is the method of the twenty-eighth embodiment, wherein the proppant is dry and wherein the (i) contacting further comprises: contacting the dry proppant (e.g., dry micro-proppant, dry fracturing sand, dry proppant particulates, or combinations thereof) with the binder composition to form coated proppant (e.g., treated with or at least partially coated with the binder composition); forming a proppant-laden fracturing fluid comprising the coated proppant and a carrier fluid; pumping the proppant-laden fracturing fluid via the wellbore into fractures of the subterranean formation; and depositing the coated proppant into at least a portion of the fractures prior to the (ii) binding.

A thirtieth embodiment which is the method of the twenty-eighth embodiment, wherein the (i) contacting further comprises: combining an aqueous carrier fluid, the proppant, and the binder composition to form a proppant-laden fracturing fluid comprising coated proppant; pumping the proppant-laden fracturing fluid via the wellbore into at least a portion of the fractures; and depositing the coated proppant into at least a portion of the fractures prior to the (ii) binding.

A thirty-first embodiment which is the method of the twenty-eighth embodiment, wherein the (i) contacting further comprises contacting a liquid first component of a binder composition with dry proppant (e.g., dry micro-proppant, dry fracturing sand, dry proppant particulates, or combinations thereof) to form pre-treated proppant; combining a carrier fluid, the pre-treated proppant and a second component of the binder composition to form a proppant-laden fracturing fluid comprising coated proppant, wherein the first component of the binder composition comprises the poly-epoxy glycerol-based oil and the soluble organic acid with two or more acid groups or the crosslinker, wherein the second component of the binder composition comprises the poly-epoxy glycerol-based oil and the soluble organic acid with two or more acid groups or the crosslinker, and wherein the first component of the binder composition is different than the second component of the binder composition; pumping the proppant-laden fracturing fluid via the wellbore into at least a portion of the fractures; and depositing the coated proppant into at least a portion of the fractures.

A thirty-second embodiment which is the method of the twenty-sixth embodiment, wherein the (i) contacting occurs downhole.

A thirty-third embodiment which is the method of the thirty-second embodiment wherein the particulate material comprises (a) proppant (e.g., micro-proppant, fracturing sand, proppant particulates, or combinations thereof) deposited in fractures of the subterranean formation (e.g., consolidation of proppant bed/pack for flowback control); (b) formation particulates (e.g., consolidation of formation sands and formation fines, for example in weakly consolidated, unconsolidated, or clay-laden intervals of the formation); (c) gravel, sand, or both adjacent a sand control screen (e.g., consolidation of sand screen completion); (d) particulates adjacent to a face, surface, or wall of the wellbore (e.g., consolidation while drilling through production zone in unconsolidated, weakly consolidated, or clay-laden interval of the formation); (e) particulates adjacent to a face or surface of the fracture (e.g., consolidation while fracturing in unconsolidated, weakly consolidated, or clay-laden interval of the formation); or (f) any combination of (a)-(e).

A thirty-fourth embodiment which is the method of the thirty-second or thirty-third embodiment wherein after (i) contacting, the particulate material forms a consolidated material downhole with the binder composition.

A thirty-fifth embodiment which is the method of the thirty-fourth embodiment wherein the consolidated material comprises a consolidated proppant pack.

A thirty-sixth embodiment which is the method of the thirty-second embodiment wherein a treatment fluid comprising the binder composition and a carrier fluid is foamed, is an emulsion, or both.

A thirty-seventh embodiment which is the method of the thirty-second embodiment wherein a treatment fluid comprises a first aqueous component comprising the poly-epoxy glycerol-based oil and the soluble organic acid with two or more acid groups and a second aqueous component comprising the crosslinker, and wherein the (i) contacting further comprises sequentially contacting at least a portion of the proppant present in fractures of the subterranean formation with the first aqueous component comprising the poly-epoxy glycerol-based oil and the soluble organic acid with two or more acid groups followed by an optional spacer fluid, followed by the second aqueous component comprising the crosslinker, sequentially contacting at least a portion of the proppant present in fractures of the subterranean formation with the second aqueous component comprising the crosslinker followed by an optional spacer fluid followed by the first aqueous component comprising the poly-epoxy glycerol-based oil and the soluble organic acid with two or more acid groups, or simultaneously contacting at least a portion of the proppant present in fractures of the subterranean formation with the first aqueous component comprising the poly-epoxy glycerol-based oil and the soluble organic acid with two or more acid groups and the second aqueous component comprising the crosslinker.

A thirty-eighth embodiment which is the method of the twenty-sixth embodiment wherein the (ii) binding further comprises allowing an organic acid with two or more acid groups to react in the presence of a crosslinker with the poly-epoxy glycerol-based oil at an activation temperature in a broadest range of from about 25 °C to about 400 °C; in an intermediate range of from about 45 °C to about 180 °C; or in a preferred range of from about 50 °C to about 93 °C.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method of servicing a well having a wellbore extending from a surface wellsite and penetrating a subterranean formation, comprising:

(i) contacting a binder composition with a particulate material; and (ii) binding the particulate material with the binder composition to form a consolidated particulate material in the wellbore, in the subterranean formation, or both, wherein the binder composition comprises an amine-free biomolecule-derived binder composition comprising a poly-epoxy glycerol-based oil comprising an epoxidated soybean oil, an epoxidized linseed oil, an epoxidized castor oil, an epoxidized perilla oil, an epoxidized hemp oil, an epoxidized tall oil fatty acid (TOFA), an epoxidized 2-ethylhexyl TOFA, an epoxidized isoamyl TOFA, or a combination thereof, a crosslinker comprising a tannic acid, a Hanin, a gallotannin, an ellagitannin, a proanthocyanidin, a phlorotannin, a phoroglucinol, a catechol, a gallic acid, or a combination thereof, and a soluble organic acid with two or more acid groups comprising malic acid, citric acid, tartaric acid, succinic acid, malonic acid, oxalic acid, ellagic acid, or a combination thereof, wherein the binder composition is substantially absent of an amine crosslinker and an aminosilane docking agent wherein the binding comprises allowing the soluble organic acid to react in the presence of the crosslinker with the poly-epoxy glycerol-based oil, and wherein the binding occurs at an activation temperature of about 50 °C to about 93 °C.

2. The method of claim 1, further comprising forming the consolidated particulate material in the wellbore, in the subterranean formation, or both via contact with the binder composition.

3. The method of claim 1, wherein the (i) contacting occurs at a surface and the particulate material comprises a proppant.

4. The method of claim 3, wherein the proppant comprises a micro-proppant, a fracturing sand, proppant particulates, or combinations thereof.

5. The method of claim 3, wherein the proppant is dry and wherein the (i) contacting further comprises: contacting a dry proppant with the binder composition to form a coated proppant; forming a proppant-laden fracturing fluid comprising the coated proppant and a carrier fluid; pumping the proppant-laden fracturing fluid via the wellbore into fractures of the subterranean formation; and depositing the coated proppant into at least a portion of the fractures prior to the (ii) binding.

6. The method of claim 1, wherein the (i) contacting further comprises:

combining an aqueous carrier fluid, a proppant, and the binder composition to form a proppant-laden fracturing fluid comprising a coated proppant; pumping the proppant-laden fracturing fluid via the wellbore into at least a portion of the fractures; and depositing the coated proppant into at least a portion of the fractures prior to the (ii) binding.

7. The method of claim 1, wherein the (i) contacting further comprises contacting a liquid first component of a binder composition with a dry proppant to form a pre-treated proppant; combining a carrier fluid, the pre-treated proppant and a second component of the binder composition to form a proppant-laden fracturing fluid comprising a coated proppant, wherein the liquid first component of the binder composition comprises the poly-epoxy glycerol-based oil and the soluble organic acid with the two or more acid groups or the crosslinker, wherein the second component of the binder composition comprises the poly-epoxy glycerol-based oil and the soluble organic acid with the two or more acid groups or the crosslinker, and wherein the liquid first component of the binder composition is different than the second component of the binder composition; pumping the proppant-laden fracturing fluid via the wellbore into at least a portion of fractures; and depositing the coated proppant into at least a portion of the fractures.

8. The method of claim 1, wherein the (i) contacting occurs downhole.

9. The method of claim 1, wherein the particulate material comprises (a) a proppant deposited in fractures of the subterranean formation; (b) formation particulates; (c) gravel, sand, or both adjacent a sand control screen; (d) particulates adjacent to a face, a surface, or a wall of the wellbore; (e) particulates adjacent to a face or a surface of a fracture; or (f) any combination of (a)-(e).

10. The method of claim 9, wherein the particulate material comprises the proppant, and the proppant comprises a micro-proppant, a fracturing sand, proppant particulates, or combinations thereof.

11. The method of claim 1, wherein after (i) contacting, the particulate material forms a consolidated material downhole with the binder composition.

12. The method of claim 1, wherein the consolidated particulate material comprises a consolidated proppant pack.

13. The method of claim 1, wherein a treatment fluid comprising the binder composition and a carrier fluid is foamed, is an emulsion, or both.

14. The method of claim 1, wherein a treatment fluid comprises a first aqueous component comprising the poly-epoxy glycerol-based oil and the soluble organic acid with the two or more acid groups and a second aqueous component comprising the crosslinker, and wherein the (i) contacting further comprises sequentially contacting at least a portion of a proppant present in fractures of the subterranean formation with the first aqueous component comprising the poly-epoxy glycerol-based oil and the soluble organic acid with the two or more acid groups followed by an optional spacer fluid, followed by the second aqueous component comprising the crosslinker, sequentially contacting the at least the portion of the proppant present in fractures of the subterranean formation with the second aqueous component comprising the crosslinker followed by an optional spacer fluid followed by the first aqueous component comprising the poly-epoxy glycerol-based oil and the soluble organic acid with the two or more acid groups, or simultaneously contacting the at least the portion of the proppant present in fractures of the subterranean formation with the first aqueous component comprising the poly-epoxy glycerol-based oil and the soluble organic acid with the two or more acid groups and the second aqueous component comprising the crosslinker.

15. The method of claim 1, wherein the (ii) binding further comprises allowing an organic acid with the two or more acid groups to react in the presence of the crosslinker with the poly-epoxy glycerol-based oil at an activation temperature in a range of from about 25 °C to about 400 °C.

16. The method of claim 1, wherein the poly-epoxy glycerol-based oil comprises the epoxidized soybean oil, the crosslinker comprises the tannic acid, and the soluble organic acid with two or more acid groups comprises the malic acid.

17. The method of claim 1, wherein the poly-epoxy glycerol-based oil comprises the epoxidized linseed oil, the epoxidized castor oil, the epoxidized tall oil fatty acid (TOFA), or a combination thereof.

18. A method of servicing a well having a wellbore extending from a surface wellsite and penetrating a subterranean formation, comprising:

(i) contacting a binder composition with a particulate material; and (ii) binding the particulate material with the binder composition to form consolidated particulate material in the wellbore, in the subterranean formation, or both, wherein the binder composition comprises an amine-free biomolecule-derived binder composition comprising a poly-epoxy glycerol-based oil comprising an epoxidated soybean oil, an epoxidized linseed oil, an epoxidized castor oil, an epoxidized perilla oil, an epoxidized hemp oil, an epoxidized tall oil fatty acid (TOFA), an epoxidized 2-ethylhexyl TOFA, an epoxidized isoamyl TOFA, or a combination thereof, a crosslinker comprising a tannic acid. a lignin, a gallotannin, an ellagitannin, a proanthocyanidin, a phlorotannin, a phoroglucinol, a catechol, a gallic acid, or a combination thereof, and a soluble organic acid with two or more acid groups comprising malic acid, citric acid, tartaric acid, succinic acid, malonic acid, oxalic acid, ellagic acid, or a combination thereof, and wherein the binder composition is substantially absent of an amine crosslinker and an aminosilane docking agent, wherein the binding comprises allowing the soluble organic acid to react in the presence of the crosslinker with the poly-epoxy glycerol-based oil, wherein the binding occurs at an activation temperature of about 50 °C to about 93 °C, wherein a treatment fluid comprising the binder composition and a carrier fluid is foamed, is an emulsion, or both, and wherein the (i) contacting further comprises contacting a liquid first component of the binder composition with a dry proppant to form a pre-treated proppant; combining the carrier fluid. the pre-treated proppant and a second component of the binder composition to form a proppant-laden fracturing fluid comprising a coated proppant, wherein the liquid first component of the binder composition comprises the poly-epoxy glycerol-based oil and the soluble organic acid with the two or more acid groups or the crosslinker, wherein the second component of the binder composition comprises the poly-epoxy glycerol-based oil and the soluble organic acid with the two or more acid groups or the crosslinker, and wherein the liquid first component of the binder composition is different than the second component of the binder composition; pumping the proppant-laden fracturing fluid via the wellbore into at least a portion of fractures; and depositing the coated proppant into at least a portion of the fractures.

* * * * *